US008582856B2

(12) United States Patent  (10) Patent No.: US 8,582,856 B2
Endo et al.  (45) Date of Patent: Nov. 12, 2013

(54) IMAGE PROCESSING APPARATUS, IMAGE PROCESSING METHOD, AND PROGRAM

(75) Inventors: Takaaki Endo, Urayasu (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 12/969,178

(22) Filed: Dec. 15, 2010

(65) Prior Publication Data

US 2011/0150310 A1  Jun. 23, 2011

(30) Foreign Application Priority Data

Dec. 18, 2009  (JP) ................................ 2009-288457

(51) Int. Cl.
*G06K 9/00*  (2006.01)
(52) U.S. Cl.
USPC ........... 382/131; 382/154; 382/128; 600/411; 600/443; 345/420; 345/423; 345/424
(58) Field of Classification Search
USPC .......... 382/154, 131, 132, 128; 345/419, 158, 345/420, 423, 424; 600/411, 443
See application file for complete search history.

(56) References Cited

U.S. PATENT DOCUMENTS

| 4,787,393 | A | * | 11/1988 | Fukukita et al. ............... 600/440 |
| 5,200,910 | A | * | 4/1993 | Subbiah ............................. 703/2 |
| 5,561,696 | A | * | 10/1996 | Adams et al. .................... 378/58 |
| 5,873,829 | A | * | 2/1999 | Kamiyama et al. ........... 600/443 |
| 7,260,426 | B2 | * | 8/2007 | Schweikard et al. ......... 600/407 |
| 2003/0016851 | A1 | * | 1/2003 | Kaufman et al. ............. 382/131 |
| 2003/0194121 | A1 | * | 10/2003 | Eberhard et al. .............. 382/132 |
| 2004/0210137 | A1 | * | 10/2004 | Baba et al. ..................... 600/443 |
| 2005/0010106 | A1 | * | 1/2005 | Lang et al. ..................... 600/425 |
| 2005/0111714 | A1 | * | 5/2005 | Shen et al. ..................... 382/128 |
| 2005/0113681 | A1 | * | 5/2005 | DeFreitas et al. ............. 600/426 |
| 2006/0036156 | A1 | * | 2/2006 | Lachaine et al. .............. 600/411 |
| 2006/0159321 | A1 | * | 7/2006 | Takeo et al. ................... 382/128 |
| 2006/0235669 | A1 | * | 10/2006 | Charbel et al. .................. 703/11 |
| 2007/0038085 | A1 | * | 2/2007 | Zhang et al. .................. 600/437 |

(Continued)

FOREIGN PATENT DOCUMENTS

JP  2001511031 U  8/2001
JP  2008-073305 A  4/2008

(Continued)

OTHER PUBLICATIONS

Wang, H.; Bin Zheng; Good, W.; Tian-Ge Zhuang, "Thin-plate spline based automatic alignment of dynamic MR breast images," Engineering in Medicine and Biology Society, 2000. Proceedings of the 22nd Annual International Conference of the IEEE , vol. 4, No., pp. 2850,2853 vol. 4, 2000.*

*Primary Examiner* — Stephen R Koziol
*Assistant Examiner* — Shaghayegh Azima
(74) *Attorney, Agent, or Firm* — Canon U.S.A., Inc. IP Division

(57) ABSTRACT

An image processing apparatus includes a correlating unit configured to acquire correlation information that correlates a first three-dimensional image of a target object with a second three-dimensional image of the target object, and a corresponding cross-sectional image generation unit configured to generate a corresponding cross-sectional image of one of the first three-dimensional image and the second three-dimensional image, if a cross section is set on the other of the first three-dimensional image and the second three-dimensional image, based on the correlation information.

9 Claims, 7 Drawing Sheets

(56) References Cited

U.S. PATENT DOCUMENTS

| | | | |
|---|---|---|---|
| 2008/0077011 A1* | 3/2008 | Azuma et al. | 600/443 |
| 2008/0077013 A1* | 3/2008 | Kawagishi et al. | 600/443 |
| 2008/0101536 A1* | 5/2008 | Sendai | 378/22 |
| 2008/0123924 A1* | 5/2008 | Nabatame et al. | 382/131 |
| 2008/0154122 A1* | 6/2008 | Vaillant et al. | 600/424 |
| 2008/0198966 A1* | 8/2008 | Hjarn et al. | 378/37 |
| 2008/0292131 A1* | 11/2008 | Takemoto et al. | 382/100 |
| 2009/0018448 A1* | 1/2009 | Seo et al. | 600/443 |
| 2009/0097778 A1 | 4/2009 | Washburn et al. | |
| 2009/0129650 A1* | 5/2009 | Hawkes et al. | 382/131 |
| 2009/0264758 A1* | 10/2009 | Fujita et al. | 600/443 |
| 2009/0290769 A1* | 11/2009 | Matsumoto | 382/128 |
| 2010/0104157 A1* | 4/2010 | Doyle | 382/131 |
| 2010/0135550 A1* | 6/2010 | Arnon | 382/128 |
| 2010/0149174 A1* | 6/2010 | Nakao et al. | 345/419 |
| 2010/0260405 A1* | 10/2010 | Cinader, Jr. | 382/131 |
| 2011/0144500 A1* | 6/2011 | Nihei et al. | 600/443 |
| 2011/0176716 A1* | 7/2011 | Kim et al. | 382/131 |
| 2011/0216958 A1* | 9/2011 | Satoh et al. | 382/131 |
| 2011/0255761 A1* | 10/2011 | O'Dell et al. | 382/131 |
| 2011/0262015 A1* | 10/2011 | Ishikawa et al. | 382/128 |
| 2012/0155727 A1* | 6/2012 | Orderud | 382/131 |

FOREIGN PATENT DOCUMENTS

| | | |
|---|---|---|
| JP | 2008086400 A | 4/2008 |
| JP | 2009000328 A | 1/2009 |
| JP | 2009-090120 A | 4/2009 |

* cited by examiner

IMAGE PROCESSING APPARATUS, IMAGE PROCESSING METHOD, AND PROGRAM

BACKGROUND OF THE INVENTION

1. Field of the Invention

The present invention relates to a medical system capable of processing an image captured with a medical image collection apparatus. More specifically, the present invention relates to a technique capable of associating a plurality of cross-sectional images with each other and generating corresponding cross-sectional images from different three-dimensional images.

2. Description of the Related Art

In the medical field physicians diagnose a site of lesion while reading a medical image of a target object displayed on a monitor. Tomographic images (i.e., three-dimensional images) of the inner state of target objects are widely used as medical images.

The medical image collection apparatus (i.e., the modality) capable of capturing tomographic images is, for example, an ultrasonic image diagnosis apparatus (ultrasonic apparatus), an Optical Coherence Tomography (OCT apparatus), a Magnetic Resonance Imaging apparatus (MRI apparatus), an X-ray Computed Tomography apparatus (X-ray CT apparatus), or a combination of like apparatuses.

For example, in the field of mammary gland imaging, the procedure of imaging diagnosis may include identifying a lesion position in a breast based on an image captured with an MRI apparatus and observing a state of the identified lesion with an ultrasonic apparatus.

In this case, an image capturing protocol in the mammary gland imaging department generally includes performing an imaging operation with the MRI apparatus in a state where a diagnosis target is held in a prone position and then performing an imaging operation with the ultrasonic apparatus in a state where the diagnosis target is held in a supine position.

In this case, considering a deformation of the breast occurring when the posture of the diagnosis target changes in the above described image capturing operations, a physician obtains an estimated position of the supine position lesion based on the position of the lesion identified based on the prone position MRI image. Then, the physician operates the ultrasonic apparatus to capture an image of the lesion at the estimated position of the lesion.

However, the deformation of a breast occurring due to a change in image-capturing posture is very large. Therefore, the position of a lesion in the supine position estimated by the physician may greatly differ from an actual lesion position. To solve this problem, it may be useful to use a conventional method for generating a virtual supine position MRI image that can be obtained by performing deformation processing on a prone position MRI image.

The position of a lesion in the virtual supine position MRI image can be calculated based on information relating to the deformation from the prone position to the supine position. Alternatively, the position of a lesion on an image can be directly obtained by reading the generated virtual supine position MRI image.

If the deformation processing is accurate enough, the actual lesion in the supine position will be present in the vicinity of the estimated lesion position on the virtual supine position MRI image.

Further, not only calculating the position of a lesion on the supine position MRI image that corresponds to the actual lesion position on the prone position MRI image but also displaying corresponding cross sections of the prone position MRI image and the supine position MRI image may be often required.

For example, the physician may want to precisely observe a state of the lesion on the original image. To this end, it is necessary to display a cross-sectional image of a non-deformed prone position MRI image that corresponds to a cross section including the lesion designated on a deformed virtual supine position MRI image.

In addition, the physician may want to confirm how a cross section of the non-deformed prone position MRI image changes to a cross section of the deformed virtual supine position MRI image.

Currently, there is a conventional method for displaying corresponding cross-sectional images taken from two three-dimensional images that are different from each other in deformation state. Japanese Patent Application Laid-Open No. 2008-073305 (hereafter "JP 2008-073305") discloses an example of such a conventional method.

According to the method disclosed in JP 2008-073305, processing to be first executed is deforming a previous three-dimensional image so as to fit to a present three-dimensional image. Further, processing to be next executed is displaying a present cross-sectional image together with a previous cross-sectional image in such a manner that two images are arranged symmetrically in the right and left direction or symmetrically in the up and down direction.

In addition, Japanese Patent Application Laid-Open No. 2009-090120 (hereafter "JP 2009-090120") discloses a method of displaying two image slices positioned on the same plane. Specifically, in the method disclosed in JP 2009-090120, an image slice is designated in one image data set to discriminate a corresponding image slice in the other image data set, so as to display the two image slices positioned on the same plane.

However, according to the method discussed in JP 2008-073305, segmented cross sections corresponding to each other are extracted after the previous three-dimensional image and the present three-dimensional image are deformed to have an identical shape. That is, processing time and resources are required to obtain deform the images and obtain the identical shape.

Therefore, the method discussed in JP 2008-073305 is unable to display corresponding cross-sectional images while maintaining differences in shape.

On the other hand, the method discussed in JP 2009-090120 merely suggests selecting image slices from respective image data sets. Therefore, in ordinary cases, the method discussed in JP 2009-090120 is unable to appropriately generate a corresponding cross-sectional image in the other image data set so as to correspond to a cross-sectional image designated in one image data set.

SUMMARY OF THE INVENTION

The present invention is directed to a technique capable of generating corresponding cross-sectional images from different three-dimensional images even if differences in shape between the images are maintained.

According to an aspect of the present invention, an image processing apparatus includes a correlating unit configured to acquire correlation information that correlates a first three-dimensional image of a target object with a second three-dimensional image of the target object, and a corresponding cross-sectional image generation unit configured to generate a corresponding cross-sectional image of one of the first three-dimensional image and the second three-dimensional image, if a cross section is set on the other of the first three-dimensional image and the second three-dimensional image, based on the correlation information.

Further features and aspects of the present invention will become apparent to persons having ordinary skill in the art from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

An image processing apparatus according to the present exemplary embodiment calculates an approximate plane, i.e., a plane approximating a corresponding cross section (curved surface) of an MRI image under a first deformation condition, which corresponds to a cross section in the MRI image under a second deformation condition. Further, the image processing apparatus displays an image of the cross section together with an image of the corresponding cross section.

In the present exemplary embodiment, the case where a breast of a human body is an example of a target object will be described. Further, in the present exemplary embodiment, it is assumed that the first deformation condition represents a state where the breast is held in a prone position with respect to a gravitational direction and the second deformation condition represents a state where the breast is held in a supine position with respect to the gravitational direction.

In the present exemplary embodiment, it is assumed that a supine position MRI image is a virtual image that can be obtained by performing deformation processing on a prone position MRI image having been actually obtained. Further, it is assumed that a cross section representing a tomographic image that can be obtained by momentarily capturing an image of the target object held in the supine position with an ultrasonic apparatus is set as a cross section of the supine position MRI image. Hereinafter, the image processing apparatus according to the present exemplary embodiment is described below.

Figure 1:
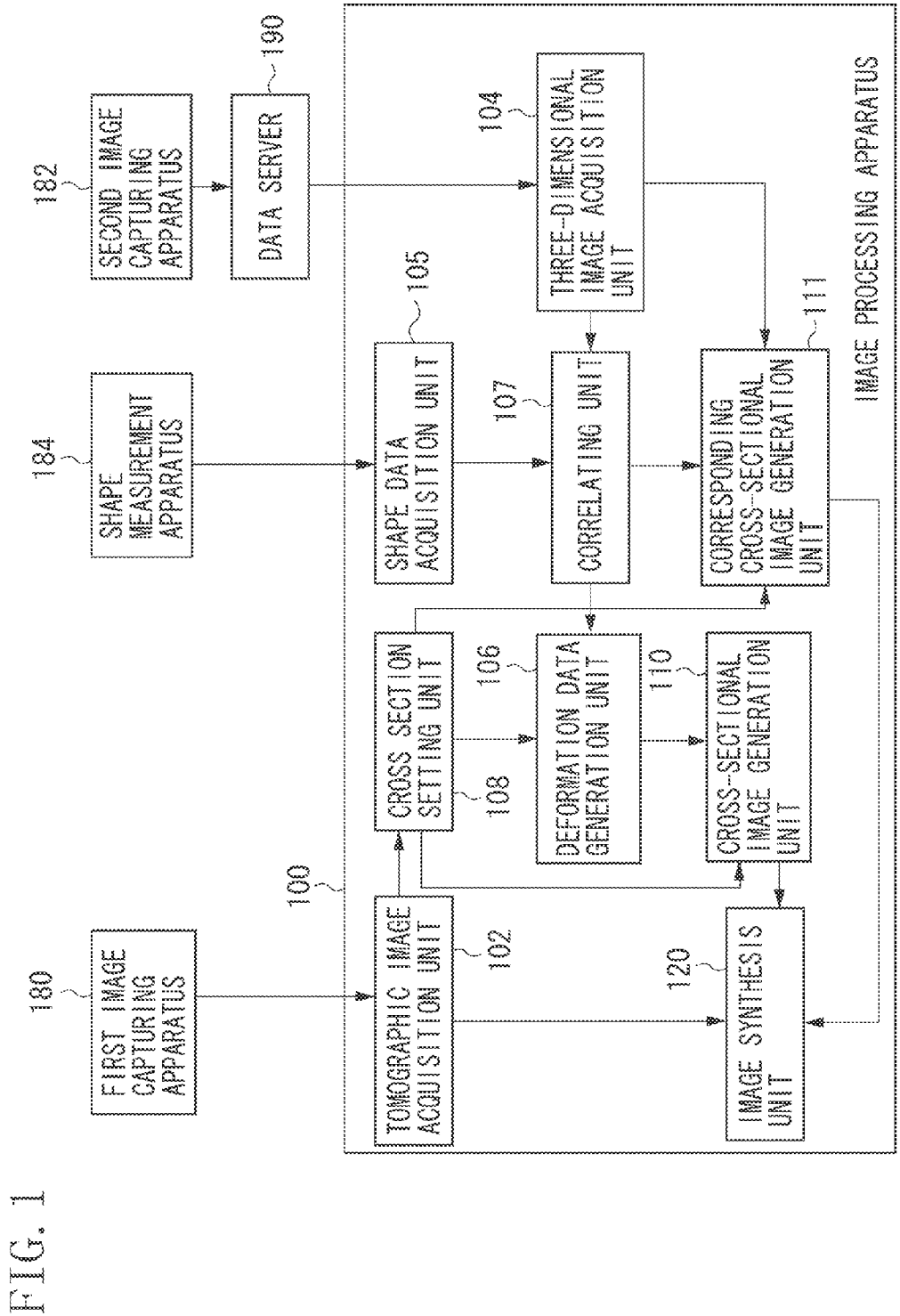
FIG. 1 is a block diagram illustrating a device configuration of an image processing apparatus according to a first exemplary embodiment of the present invention.

FIG. 1 is a block diagram illustrating an example configuration of an image processing apparatus according to the present exemplary embodiment. As illustrated in FIG. 1, an image processing apparatus 100 according to the present exemplary embodiment is connected to a first image capturing apparatus 180, a shape measurement apparatus 184, and a data server 190.

The first image capturing apparatus 180 is, for example, an ultrasonic apparatus that is configured to capture an image of each target object held in the supine position with a probe (not shown). It is assumed that during the image-capture operation the probe transmits an ultrasonic signal towards the target object and receives the ultrasonic signal returning from target object in a known manner.

It is further assumed that the position and orientation of the probe during an image-capturing operation can be measured by a position and orientation sensor, also in a known manner. Further, it is assumed that the measured position and orientation of the probe can be converted into position and orientation information representing an ultrasonic tomographic image in a reference coordinate system (i.e., a coordinate system being set in a space including the target object as a reference object), and is associated with the ultrasonic tomographic image. Accordingly, it is assumed that position and orientation information is attached to each input ultrasonic tomographic image.

The position and orientation sensor can be any type of sensor that is configured to obtain measurement information representing the position and orientation of the probe. And a description is omitted since it is peripheral technology. Ultrasonic tomographic images captured by the first image capturing apparatus 180 are defined in the reference coordinate system, and are successively input into the image processing apparatus 100 via a tomographic image acquisition unit 102.

The data server 190 stores three-dimensional images (i.e., first three-dimensional images) obtained by capturing images of a target object in the prone position with an MRI apparatus serving as a second image capturing apparatus 182. The three-dimensional images stored in data server 190 are also converted into images defined in the reference coordinate system. The first three-dimensional images stored in the data server 190 can be input into the image processing apparatus 100 via a three-dimensional image acquisition unit 104.

The shape measurement apparatus 184 is, for example, a range sensor that can momentarily measure a surficial shape of a dynamically changing target object held in the supine position to obtain shape data. The shape data obtained by shape measurement apparatus 184 can be successively input into the image processing apparatus 100 via a shape data acquisition unit 105. The shape measurement apparatus 184 is not limited to the range sensor and can be constituted by any other measuring device capable of momentarily measuring the shape of the target object (e.g., a stereo image measurement device).

The image processing apparatus 100 includes a plurality of constituent components described below.

The tomographic image acquisition unit 102 successively acquires ultrasonic tomographic images input to the image processing apparatus 100 and outputs the acquired ultrasonic tomographic images to a cross section setting unit 108 and further to an image synthesis unit 120. In the present exemplary embodiment, it is assumed that each ultrasonic tomographic image is accompanied with position and orientation information defined in the reference coordinate system.

The three-dimensional image acquisition unit 104 acquires each first three-dimensional image input to the image processing apparatus 100 and further outputs the acquired first three-dimensional image to a deformation data generation unit 106 and also to a corresponding cross-sectional image generation unit 111.

The shape data acquisition unit 105 successively acquires shape data input into the image processing apparatus 100 and outputs the acquired shape data to the deformation data generation unit 106.

The deformation data generation unit 106 can perform deformation processing on the input first three-dimensional image to generate a second three-dimensional image having a deformed surficial shape substantially similar to that of the measured shape data, and can output the generated second three-dimensional image to a cross-sectional image generation unit 110.

A correlating unit 107 can obtain "correlation information", which represents a correspondence relationship between respective coordinates in the deformation processing from the first three-dimensional image to the second three-dimensional image. The obtained correlation information can be stored in a predetermined storage unit of the image processing apparatus 100 or elsewhere.

The deformation data generation unit 106 can refer to the correlation information in associating respective coordinates of the first three-dimensional image with respective coordinates of the second three-dimensional image.

Further, the deformation data generation unit 106 can calculate a three-dimensional displacement vector group, which is usable to inversely transform the second three-dimensional image back into the first three-dimensional image, based on the correlation information and can output the calculated three-dimensional displacement vector group to the corresponding cross-sectional image generation unit 111.

The cross section setting unit 108 sets a cross section in the second three-dimensional image based on the position and orientation information attached to each input ultrasonic tomographic image. To this end, the cross section setting unit 108 acquires an ultrasonic tomographic image from the tomographic image acquisition unit 102.

Then, the cross section setting unit 108 sends the position and orientation (i.e., the attached information) of the ultrasonic tomographic image defined in the reference coordinate system to the cross-sectional image generation unit 110 and also to the corresponding cross-sectional image generation unit 111. The position and orientation of the ultrasonic tomographic image serves as position and orientation information of a plane representing the cross section in the second three-dimensional image.

The cross-sectional image generation unit 110 generates an image of the cross section set in the second three-dimensional image. To this end, the cross-sectional image generation unit 110 acquires the second three-dimensional image from the deformation data generation unit 106 and the position and orientation of the cross section from the cross section setting unit 108.

Then, the cross-sectional image generation unit 110 generates a cross-sectional image based on the acquired second three-dimensional image and the acquired position/orientation information, and outputs the generated cross-sectional image to the image synthesis unit 120.

The corresponding cross-sectional image generation unit 111 generates a corresponding cross-sectional image in the first three-dimensional image, which corresponds to the cross section set in the second three-dimensional image, using various information acquired.

Then, the corresponding cross-sectional image generation unit 111 outputs the generated image to the image synthesis unit 120.

An example processing that can be implemented by the corresponding cross-sectional image generation unit 111 is described below in more detail with reference to a flowchart illustrating an example procedure of the entire processing that can be implemented by the image processing apparatus 100.

The image synthesis unit 120 combines an ultrasonic tomographic image, a cross-sectional image (based on the second three-dimensional image), and a corresponding cross-sectional image (based on the first three-dimensional image) and displays a synthesized image. To this end, the image synthesis unit 120 acquires an ultrasonic tomographic image from the tomographic image acquisition unit 102, a cross-sectional image from the cross-sectional image generation unit 110, and a corresponding cross-sectional image from the corresponding cross-sectional image generation unit 111. Then, the image synthesis unit 120 displays the synthesized image in an appropriate display unit to be described later.

At least a part of the components constituting the image processing apparatus 100 illustrated in FIG. 1 can be realized as an independent stand-alone apparatus. Alternatively, a single computer or a plurality of computers can be provided with a computer program (a software program) capable of realizing the above-described functions of the image processing apparatus 100.

A central processing unit (CPU) incorporated in each computer can execute the installed program to realize the above-described functions. In the present exemplary embodiment, as illustrated in FIG. 1, each component of the image processing 100 can be constituted by a separate hardware device (e.g., a processing board or CPU). Alternately, each component of image processing apparatus 100 can be realized by specifically designed software that is installed on a single computer.

Figure 2:
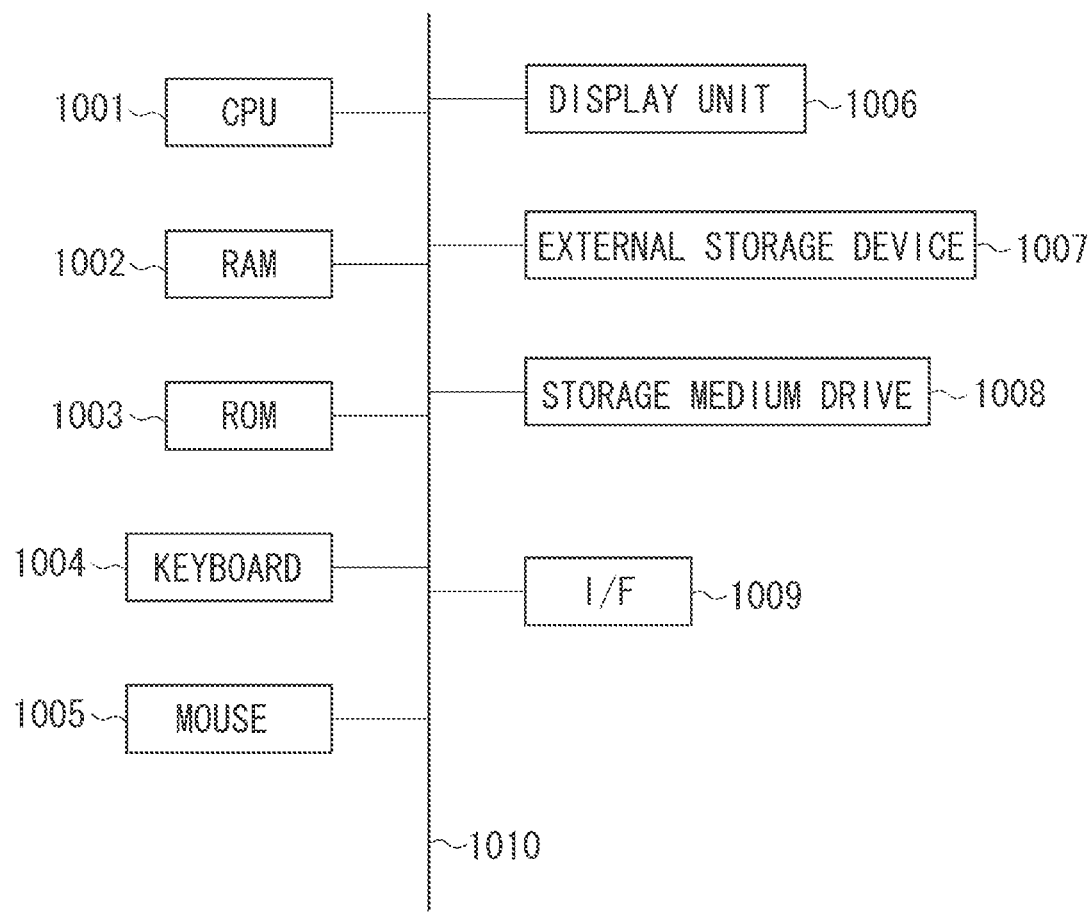
FIG. 2 is a block diagram illustrating a basic configuration of a computer that can execute a software program capable of realizing functional components of the image processing apparatus according to the first exemplary embodiment of the present invention.

FIG. 2 illustrates a basic configuration of a computer that is configured to operate hardware components or software modules capable of realizing the functions of the constituent components of image processing apparatus 100 illustrated in FIG. 1.

In FIG. 2, a central processing unit (CPU) 1001 can control an entire computer and components attached thereto based on programs and data which are stored in a random access memory (RAM) 1002 and a read only memory (ROM) 1003. Further, the CPU 1001 can control execution of the software in each unit and can realize the functions of respective units.

The RAM 1002 includes a storage area that can temporarily store programs and data loaded from an external storage device 1007 and a storage medium drive 1008. The RAM 1002 further includes a work area that can be used by the CPU 1001 when the CPU 1001 performs various processing.

In general, the ROM 1003 stores computer programs and setting data. A keyboard 1004 and a mouse 1005 are input devices that enable an operator to input various instructions and target information into the CPU 1001.

A display unit 1006, which is constituted by a cathode ray tube (CRT), a liquid crystal display (LCD) or the like, displays an ultrasonic tomographic image, a cross-sectional image, a corresponding cross-sectional image, or a combination thereof. Further, the display unit 1006 can display a message and a graphical user interface (GUI) screen to aid the operator in accomplishing the various tasks of the image processing apparatus 100.

The external storage device 1007 is, for example, a hard disk drive or any other massive information storage device capable of storing an operating system (OS) and the computer programs to be executed by the CPU 1001. Further, in the present exemplary embodiment, any information described as being already known is stored in the external storage device 1007 and can be loaded into the RAM 1002 if it is necessary.

The storage medium drive 1008 reads a stored program or data from a storage medium (e.g., a CD-ROM or a DVD-ROM) according to an instruction supplied from the CPU 1001 and outputs the read program or data onto the RAM 1002 or to the external storage device 1007.

An interface (I/F) 1009 can be constituted by an appropriate port, such as an analog video port, a digital input/output port (e.g., IEEE1394), or an Ethernet® port usable to output various information to an external device. The I/F 1009 sends input data to the RAM 1002.

At least part of the above-described functions of the tomographic image acquisition unit 102, the three-dimensional image acquisition unit 104, and the shape data acquisition unit 105 can be realized by (or attached to) the I/F 1009.

The above-described functional components 1001 to 1009 are mutually connected via a bus 1010.

Figure 3:
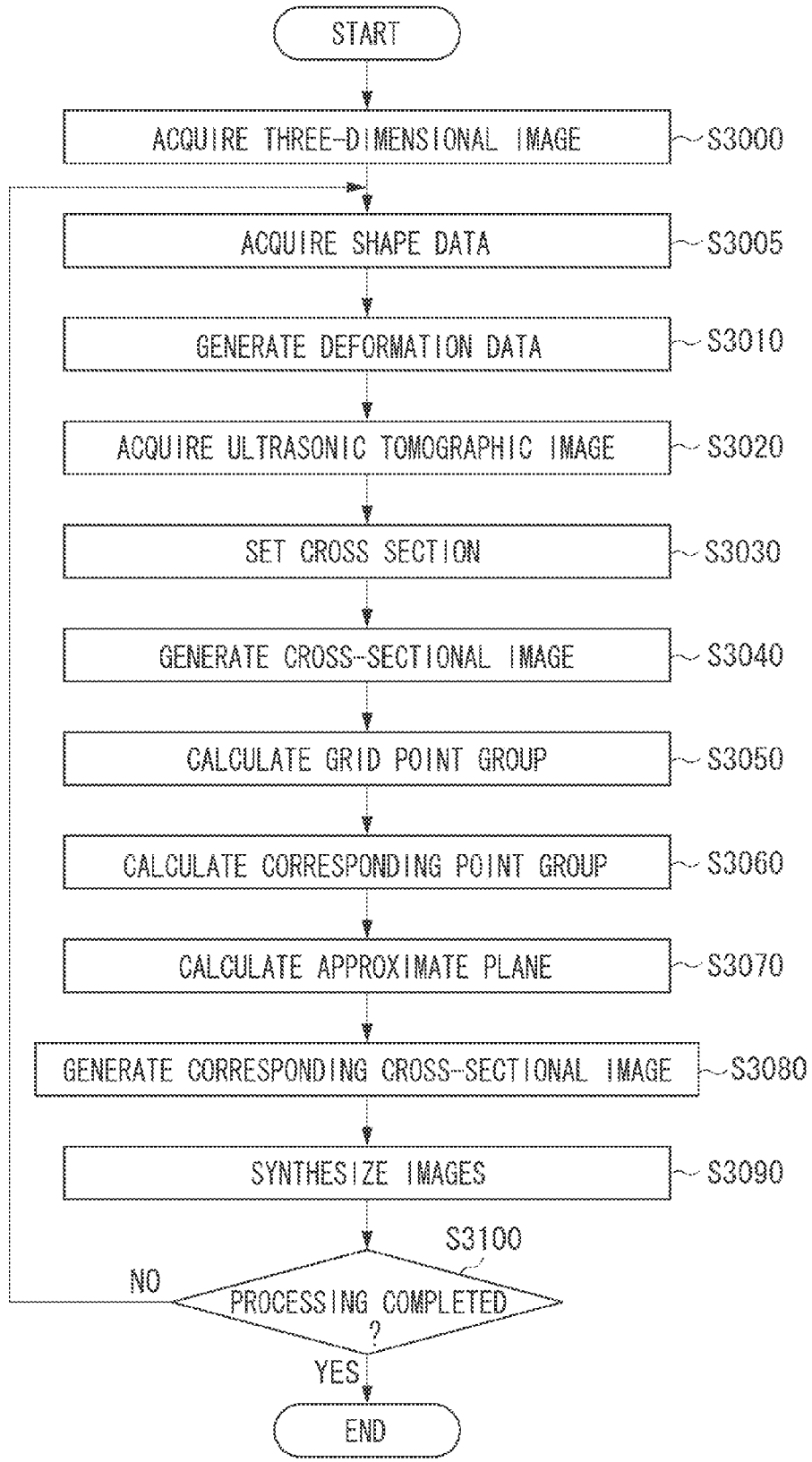
FIG. 3 is a flowchart illustrating a procedure of the entire processing according to the first exemplary embodiment of the present invention.

FIG. 3 is a flowchart illustrating an example procedure of the processing that can be implemented by the image processing apparatus 100. In the present exemplary embodiment, the CPU 1001 executes a computer-executable program that can implement or control the functions of respective constituent components so as to realize the flowchart illustrated in FIG. 3.

In the present exemplary embodiment, it is assumed that the program codes relating to the flowchart illustrated in FIG. 3 are already loaded, for example, from the external storage device 1007 to the RAM 1002, before starting the following processing.

In step S3000, the image processing apparatus 100 executes, as example processing that can be implemented by the three-dimensional image acquisition unit 104, processing for acquiring a first three-dimensional image input to the image processing apparatus 100 from the data server 190 or second image capturing apparatus 182.

In step S3005, the image processing apparatus 100 executes, as example processing that can be implemented by the shape data acquisition unit 105, processing for acquiring latest shape data momentarily input to the image processing apparatus 100 from the shape measurement apparatus 184.

In step S3010, the image processing apparatus 100 executes, as example processing that can be implemented by the deformation data generation unit 106, for generating a second three-dimensional image by applying deformation processing on the first three-dimensional image based on the first three-dimensional image and the shape data acquired in the above-described steps S300 and S305.

Further, the image processing apparatus 100 calculates a three-dimensional displacement vector group, which is usable to inversely transform the second three-dimensional image into the first three-dimensional image.

More specifically, the correlating unit 107 obtains correlation information representing a correspondence relationship between respective coordinates of different images, as information usable to generate the second three-dimensional image from the first three-dimensional image, on condition that the measured shape data substantially coincides with the surficial shape of the second three-dimensional image.

A method employable to obtain the above-described correlation information is, for example, discussed in Y. Hu, D. Morgan, H. U. Ahmed, D. Pendse, M. Sahu, C. Allen, M. Emberton and D. Hawkes, "A statistical motion model based on biomechanical simulations," Proc. MICCAI 2008, Part I, LNCS 5241, pp. 737-744, 2008.

The image processing apparatus 100 performs deformation processing on the first three-dimensional image referring to the obtained correlation information to generate the second three-dimensional image. Further, based on the above-described correlation information, the image processing apparatus 100 calculates a three-dimensional displacement vector group, which is usable to inversely transform voxel positions constituting the second three-dimensional image into voxel positions constituting the first three-dimensional image in a non-deformed state.

In step S3020, the image processing apparatus 100 executes, as example processing that can be implemented by the tomographic image acquisition unit 102, processing for acquiring a latest ultrasonic tomographic image input into the image processing apparatus 100 together with attached information representing the position and orientation of the acquired ultrasonic tomographic image defined in the reference coordinate system.

In step S3030, the image processing apparatus 100 executes, as example processing that can be implemented by the cross section setting unit 108, processing for setting the position and orientation information acquired in step S3020 that represents the ultrasonic tomographic image defined in the reference coordinate system, as position and orientation of a plane representing the cross section.

In step S3040, the image processing apparatus 100 executes, as example processing that can be implemented by the cross-sectional image generation unit 110, for generating a cross-sectional image as an image obtained by segmenting a predetermined range of the cross section having been set in step S3030 from the second three-dimensional image generated in step S3010.

In the present exemplary embodiment, a conventionally known method for segmenting and generating a designated cross-sectional image from a three-dimensional image can be used, although it is not described in detail, it is assumed that persons of ordinary skill on the art of medical imaging are familiar with such methods.

Next, the image processing apparatus 100 executes, as example processing that can be implemented by an approximate plane calculation unit (not illustrated) of the corresponding cross-sectional image generation unit 111, processing for calculating an approximate plane that is a plane approximating a corresponding cross section of the first three-dimensional image through the following processing of step S3050 to step S3070.

In step S3050, the image processing apparatus 100 executes, as example processing that can be implemented by the corresponding cross-sectional image generation unit 111, processing for segmenting the predetermined range of the plane representing the cross section having been set in step S3030 into a lattice pattern divided at equal intervals and setting a group of grid points as a grid point group.

The above-described grid points include, at least, an origin of a cross section coordinate system that represents a central position of the cross-sectional image. The cross section coordinate system defines the cross section as an XY plane and defines an axis perpendicular to the XY plane as the Z axis.

Further, the above-described grid points include four vertex points $(-X_{min2}, -Y_{min2})$, $(X_{min2}, Y_{min2})$, $(-X_{min2}, Y_{min2})$, and $(X_{min2}, Y_{min2})$ of a rectangular area representing the predetermined range having been set in step S3040 to segment the image from the cross section.

Further, the above-described grid points include respective endpoints $(-X_{min2}, 0), (X_{min2}, 0) (0, -Y_{min2})$, and $(0, Y_{min2})$ of the X and Y axes constituting the cross section coordinate system on the cross-sectional image.

Then, the image processing apparatus 100 calculates the positions of respective grid points defined in the reference coordinate system using the following formula.

$$x_{sn} = x_{in} \cdot T_{is}$$

In the above-described formula, $x_{in}$ ($=[x_{in}\ y_{in}\ z_{in}\ 1]^T$) is a homogenous coordinate expression in a three-dimensional space representing the position of an n-th grid point (n=1 to N; N is the total number of the grid points) defined in the cross section coordinate system.

Further, $x_{sn}$ ($=[x_{sn}\ y_{sn}\ z_{sn}\ 1]^T$) represents the position of the n-th grid point in the reference coordinate system. Further, $T_{is}$ is a 4×4 transformation matrix in the conversion from the cross section coordinate system to the reference coordinate system, which represents the position and orientation of the cross section having been set in step S3030. As respective grid points are present on the cross section, the element $z_{in}$ becomes 0, i.e., $z_{in}$=0 (n=1 to N).

In step S3060, the image processing apparatus 100 executes, as example processing that can be implemented by the corresponding cross-sectional image generation unit 111, processing for displacing the positions of respective grid points calculated in step S3050 based on the three-dimensional displacement vector group calculated in step S3010.

Then, the image processing apparatus 100 calculates the positions of a point group (i.e., a corresponding point group) in the first three-dimensional image, which correspond to the displaced positions of the grid point group in the second three-dimensional image.

More specifically, the image processing apparatus 100 selects, for example, a voxel constituting the second three-dimensional image that is positioned most closely to the position $x_{sn}$ of each grid point (n=1 to N). Then, the image processing apparatus 100 calculates a position $x_{dn}$ (n=1 to N) of a corresponding point in the first three-dimensional image by adding a three-dimensional displacement vector at the selected voxel position to the position of each grid point.

In general, the first three-dimensional image and the second three-dimensional image are different from each other in deformation state. Therefore, the corresponding point group $x_{dn}$ (n=1 to N) cannot be positioned on the same plane.

In step S3070, the image processing apparatus 100 executes, as example processing that can be implemented by the corresponding cross-sectional image generation unit 111, processing for calculating a plane that approximates the corresponding point group based on the positions of the point group (i.e., the corresponding point group) of the first three-dimensional image calculated in step S3060.

More specifically, the image processing apparatus 100 calculates an approximate plane that is optimized for the corresponding point group $x_{dn}$ (n=1 to N) using a general plane fitting method, such as least squares method or maximum likelihood estimation method.

Further, if an operator designates a desired approximate plane calculation method using an UI (not illustrated), the corresponding cross-sectional image generation unit 111 calculates an approximate plane using the designated calculation method.

For example, the corresponding cross-sectional image generation unit 111 can employ a calculation method including extracting the intensity of an image feature quantity (e.g., an edge) in the vicinity of each grid point from the cross-sectional image obtained in step S3040 and then referring to the extracted intensity value as a weighting factor for a corresponding point in obtaining an approximate plane using the least squares method.

Further, the corresponding cross-sectional image generation unit 111 can employ a calculation method including defining the position (i.e., fixing the position) of a point corresponding to the grid point representing the origin of the cross section as an origin of an approximate plane coordinate system and then calculating an orientation of an approximate plane optimized for other corresponding points.

In this case, some degrees of freedom may remain with respect to in-plane position and in-plane rotation of the approximate plane calculated in the above-described processing. Therefore, the image processing apparatus 100 further estimates an in-plane moving component of the approximate plane.

First, the image processing apparatus 100 obtains a crossing point of a perpendicular extending from the point corresponding to the grid point representing the origin of the cross section and crossing the above-described approximate plane, and defines the obtained point as the origin of the approximate plane coordinate system (more specifically, determines an in-plane position of the approximate plane).

Next, the image processing apparatus 100 successively obtains a crossing point of a perpendicular extending from each point corresponding to respective grid points positioned on the X axis of the cross section and crossing the above-described approximate plane, and defines an approximate straight line optimized for the obtained point group as an X axis of the approximate plane coordinate system (more specifically, determines the in-plane rotation of the approximate plane coordinate system).

Further, the image processing apparatus 100 calculates vertex coordinates $(-X_{min1}, -Y_{min1})$, $(X_{min1}, -Y_{min1})$, $(-X_{min1}, Y_{min1})$, and $(X_{min1}, Y_{min1})$ defining a rectangle including all of crossing points of perpendiculars extending from the corresponding point group $x_{dn}$ and crossing the above-described approximate plane.

Then, the image processing apparatus 100 defines the calculated rectangle as the above-described predetermined range usable in the next step in which segmenting of the corresponding cross-sectional image is performed.

In step S3080, the image processing apparatus 100 executes, as example processing that can be implemented by the corresponding cross-sectional image generation unit 111, processing for generating a corresponding cross-sectional image by segmenting the predetermined range of the approximate plane calculated in step S3070 from the first three-dimensional image.

In the present exemplary embodiment, a conventionally known method for segmenting and generating a designated plane image from a three-dimensional image can be used, although it is not described in detail.

Further, if an operator designates a desired corresponding cross-sectional image generation method using the UI (not illustrated), the corresponding cross-sectional image generation unit 111 generates a corresponding cross-sectional image according to the designated generation method.

For example, the corresponding cross-sectional image generation unit 111 can employ a generation method including calculating a curved surface based on the positions of the point group (i.e., the corresponding point group) in the first three-dimensional image and then defining pixel values of crossing points of perpendiculars extending from the positions of respective pixels on the approximate plane and crossing the curved surface as pixel values of respective pixels of the corresponding cross-sectional image.

According to the above-described generation method, an image of the corresponding point group projected on the approximate plane can be generated. In this case, each pixel on a genuine corresponding cross section (i.e., a curved surface) of the cross-sectional image can be displayed in such a manner that the comparison between the generated image and the cross-sectional image becomes easy.

In the present exemplary embodiment, instead of calculating the above-described curved surface, it is useful to calculate a group of triangular patches having vertex points defined by the corresponding point group.

In step S3090, the image processing apparatus 100 executes, as example processing that can be implemented by the image synthesis unit 120, processing described below. More specifically, the image processing apparatus 100 displays the ultrasonic tomographic image acquired in step S3020, the cross-sectional image generated in step S3040, and the corresponding cross-sectional image generated in step S3080 on the display unit 1006.

Figure 4:
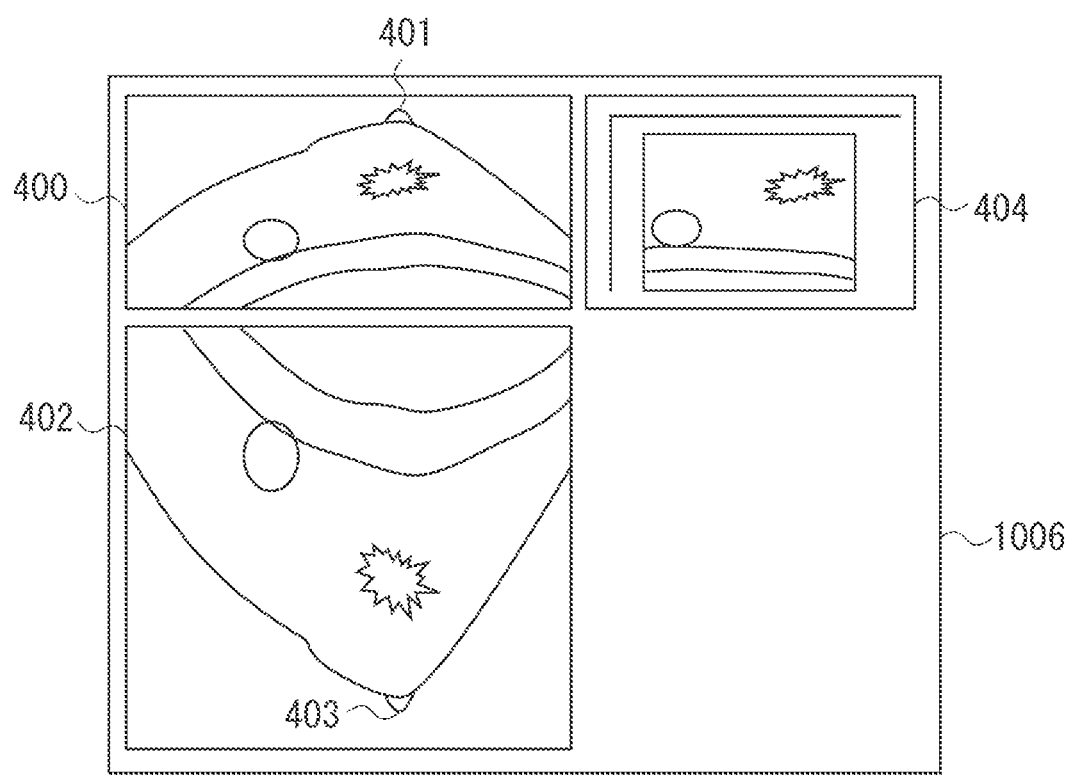
FIG. 4 illustrates an example synthesis display method according to the first exemplary embodiment of the present invention.

For example, as illustrated in FIG. 4, the image processing apparatus 100 can display a supine position cross-sectional image 400 (i.e., a cross-sectional image) in such a manner that a nipple 401 substantially faces upward (namely, the chest wall is located at a relatively lower position). Further, the image processing apparatus 100 can display a prone position cross-sectional image 402 (i.e., a corresponding cross-sectional image) in such a manner that a nipple 403 substantially faces downward (i.e., the chest wall is located at a relatively upper position).

In this case, the image processing apparatus 100 determines a relative positional relationship between two images 400 and 402 in such a manner that the supine position cross-sectional image 400 is positioned on the upper side of the screen and the prone position cross-sectional image 402 is positioned on the lower side of the screen.

Further, the image processing apparatus 100 determines the layout realizing a mirror image relationship between two images 400 and 402, according to which the images 400 and 402 are substantially symmetrical in the vertical direction. To this end, the image processing apparatus 100 reverses the prone position corresponding cross-sectional image in the right and left direction. Further, as illustrated in FIG. 4, an ultrasonic tomographic image 404 can be displayed on the right side (or the left side) of the cross-sectional image 400.

Further, if an operator designates a desired cross-sectional image display mode using the UI (not illustrated), the image synthesis unit 120 displays a cross-sectional image according to the designated display mode.

For example, the image processing apparatus 100 can employ a method for displaying a nipple facing upward (namely, displaying the chest wall at a relatively lower position) in each of the supine position cross-sectional image 400 and the prone position cross-sectional image 402 without reversing the image in the right and left direction.

In other words, with respect to the display mode for the prone position cross-sectional image 402, an operator can arbitrarily determine whether to display a nipple facing downward in a state reversed in the right and left direction or display a nipple facing upward in a state not reversed in the right and left direction.

In step S3100, the image processing apparatus 100 determines whether the entire processing has been completed. For example, an operator can click an end button disposed on the display unit 1006 with the mouse 1005 to input a termination instruction to the image processing apparatus 100. If it is determined that the entire processing has been completed (YES in step S3100), the image processing apparatus 100 terminates the processing of the flowchart illustrated in FIG. 3.

On the other hand, if it is determined that the entire processing has not been completed (NO in step S3100), the processing returns to step S3005 to repeat the above-described processing in step S3005 to step S3090 on a newly acquired ultrasonic tomographic image and shape data.

As described above, the image processing apparatus 100 can execute processing in a manner capable of realizing the present invention.

As described above, the image processing apparatus according to the present exemplary embodiment calculates a plane that approximates a corresponding cross section of a non-deformed three-dimensional image corresponding to a cross section of a deformed three-dimensional image. Therefore, the image processing apparatus according to the present exemplary embodiment can calculate a corresponding cross section without deforming two three-dimensional images into the same shape, and can display these images.

Further, the image processing apparatus according to the present exemplary embodiment can realize a correlated display enabling users to easily compare a non-deformed cross-sectional image with a deformed cross-sectional image when a deformation occurs due to a change in the posture of a diagnosis target.

In the present exemplary embodiment, the image processing apparatus 100 virtually generates a supine position MRI image by deforming a prone position MRI image. However, the present invention is not limited to the above-described embodiment. For example, the image processing apparatus 100 can capture a supine position MRI image beforehand and can virtually generate a prone position MRI image by deforming the supine position MRI image.

In this case, the image processing apparatus 100 is required to store a three-dimensional displacement vector group usable in the conversion from the non-deformed supine position MRI image into the deformed prone position three-dimensional image. Further, the present invention can be preferably employed in a case where a plurality of MRI images under a plurality of deformation conditions is generated by deforming an MRI image under the first deformation condition. Further, the target object is not limited to a breast of a human body and can be any other arbitrary target object.

In the above-described exemplary embodiment, the shape of the target object under the second deformation condition is momentarily measured and then the second three-dimensional image and the three-dimensional displacement vector group are successively calculated. However, if the shape of the target object does not dynamically change under the second deformation condition (or if such a change is negligible), it may be useful to acquire a second three-dimensional image generated beforehand.

In this case, a three-dimensional image (the second three-dimensional image) obtained beforehand by deforming the first three-dimensional image so that the shape of the target object in the first three-dimensional image substantially coincides with the shape of the target object in the supine position is stored in the data server 190.

Further, the three-dimensional displacement vector group usable in inversely transforming the deformed second three-dimensional image into the non-deformed first three-dimensional image is calculated beforehand. The calculated three-dimensional displacement vector group is converted into a vector defined in the reference coordinate system and is stored in the data server 190.

In the present exemplary embodiment, the second three-dimensional image can be acquired beforehand, for example, using the method discussed in Y. Hu, D. Morgan, H. U. Ahmed, D. Pendse, M. Sahu, C. Allen, M. Emberton and D. Hawkes, "A statistical motion model based on biomechanical simulations," Proc. MICCAI 2008, Part I, LNCS 5241, pp. 737-744, 2008.

The shape of the target object in the supine position can be acquired, for example, by measuring a surficial shape of the target object with the range sensor serving as the shape measurement apparatus 184, a stereo image measurement device, or a contact-type digitizer under the second deformation condition.

The first and second three-dimensional images and the three-dimensional displacement vector group stored in the data server 190 can be input to the image processing apparatus 100 via the three-dimensional image acquisition unit 104.

The three-dimensional image acquisition unit 104 acquires the first and second three-dimensional images and the three-dimensional displacement vector group having been input to the image processing apparatus 100. Then, the three-dimensional image acquisition unit 104 outputs the acquired first three-dimensional image and the three-dimensional displacement vector group to the corresponding cross-sectional image generation unit 111. Further, the three-dimensional image acquisition unit 104 outputs the second three-dimensional image to the cross-sectional image generation unit 110.

According to the above-described method, in a case where the shape of the target object does not dynamically change under the second deformation condition (or if such a change is negligible), it is easy to calculate corresponding cross sections of non-deformed and deformed three-dimensional images and display the calculated images.

In the above-described present exemplary embodiment, the position and orientation of an ultrasonic tomographic image of the target object held in the supine position momentarily captured by the ultrasonic apparatus is set as position and orientation of a cross section. However, the method for designating a cross section is not limited to the above-described method. Therefore, any other method capable of setting a cross section of a three-dimensional image is usable.

For example, a general method enabling an operator to designate a movement of a cross section in the rotational direction, in the rotational angle, and in each axis direction with the mouse 1005 and the keyboard 1004 is usable. An operator may move and rotate a position and orientation instruction device equipped with a position and orientation sensor, a measured position and orientation value obtained by the sensor can be acquired as the position and orientation of the cross section.

The second image capturing apparatus 182 according to the present invention is not limited to the MRI apparatus described in the above-described exemplary embodiment. For example, an X-ray CT apparatus, a photo acoustic tomography apparatus, an OCT apparatus, a Positron Emission Tomography (PET), a Single Photon Emission Computed Tomography (SPECT), or a three-dimensional ultrasonic apparatus can be used.

In the above-described exemplary embodiment, the image processing apparatus 100 generates the cross-sectional images from the first and second three-dimensional images based on a designated or calculated cross section in the processing of step S3040 and step S3080.

However, the cross-sectional image to be generated by the image processing apparatus 100 may not be an image formed based on voxel values on the cross section even when the image can be generated from a three-dimensional image based on a designated or calculated cross section.

For example, it may be useful to set a maximum intensity projection image as a cross-sectional image in a case where a predetermined range is settable in a normal direction about a cross section and a maximum value of the voxel value in the normal direction within the set range is obtainable for each point on the cross section.

In the present invention, any image generated with respect to a designated or calculated cross section as described above can be included in the "cross-sectional image" in its broader sense.

In the first exemplary embodiment, the image processing apparatus 100 calculates the approximate plane optimized for the corresponding point group using a general plane fitting method, such as the least squares method or the maximum likelihood estimation method. However, the approximate plane calculation method is not limited to the above-described method. Therefore, any other method can be employed.

Further, in the first exemplary embodiment, the image processing apparatus 100 designates a cross section in the deformed three-dimensional image and generates a corresponding cross-sectional image that corresponds to the designated cross section in the non-deformed three-dimensional image.

However, the method for displaying corresponding cross sections of the non-deformed three-dimensional image and the deformed three-dimensional image is not limited to the above-described method.

An image processing apparatus according to a second exemplary embodiment calculates an approximate plane of a corresponding cross section (i.e., a curved surface) in a deformed MRI image that corresponds to a cross section in a non-deformed MRI image based on a concerned position (i.e., a lesion position) in the MRI image.

Then, the image processing apparatus according to the second exemplary embodiment generates and displays a cross-sectional image together with a corresponding cross-sectional image.

Hereinafter, only a portion of the image processing apparatus according to the second exemplary embodiment, which is different from the image processing apparatus described in the first exemplary embodiment, is described below.

Figure 5:
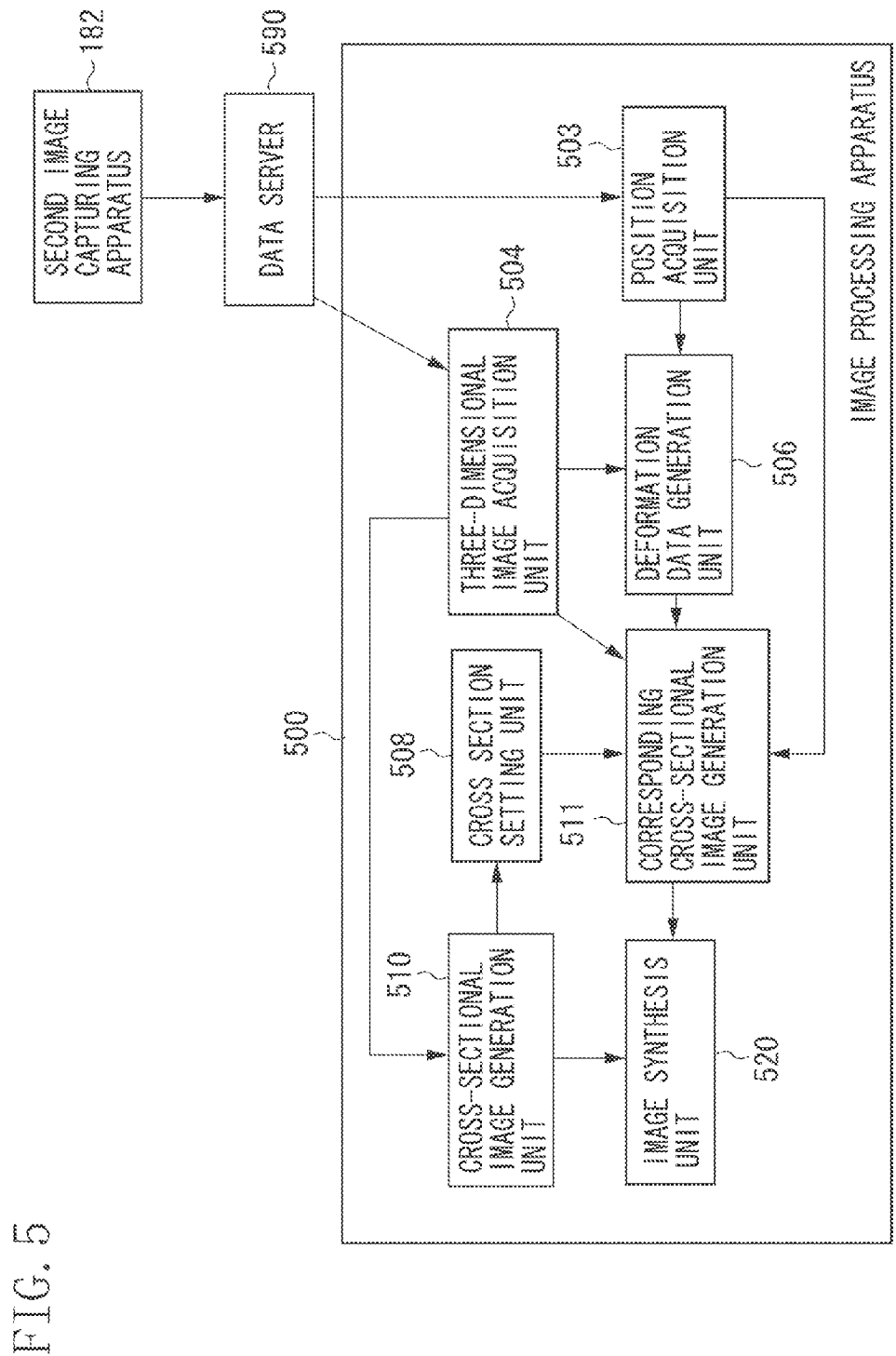
FIG. 5 is a block diagram illustrating a device configuration of an image processing apparatus according to a second exemplary embodiment of the present invention.

FIG. 5 is a block diagram illustrating an example configuration of the image processing apparatus according to the second exemplary embodiment. A component similar to that illustrated in FIG. 1 is denoted using the same reference numeral and the description thereof is not repeated. As illustrated in FIG. 5, an image processing apparatus 500 according to the second exemplary embodiment is connected to a data server 590.

The data server 590 stores three-dimensional images (i.e., first three-dimensional images) obtained by capturing images of a target object in the prone position with the MRI apparatus serving as the second image capturing apparatus 182 together with information relating to a first lesion position indicating the position of a lesion in the first three-dimensional image.

Further, the data server 590 stores three-dimensional images (i.e., second three-dimensional images) obtained by deforming the first three-dimensional images beforehand so that a first shape representing the shape of the target object in the first three-dimensional image substantially coincides with the shape of the target object in the supine position.

Further, the data server 590 stores a three-dimensional displacement vector group usable in conversion from a non-deformed first three-dimensional image to a deformed second three-dimensional image, calculated beforehand as correlation information representing a correspondence relationship between respective coordinates of different images, which is converted into a vector defined in the reference coordinate system.

The first and second three-dimensional images and the three-dimensional displacement vector group stored in the data server 590 can be input to the image processing apparatus 500 via a three-dimensional image acquisition unit 504. Further, the first lesion position data stored in the data server 590 can be input to the image processing apparatus 500 via a position acquisition unit 503.

The position acquisition unit 503 acquires the first lesion position data having been input in the image processing apparatus 500 as the position of a concerned point, and outputs the acquired positional information of the concerned point to a deformation data generation unit 506 and a corresponding cross-sectional image generation unit 511.

The three-dimensional image acquisition unit 504 acquires the first and second three-dimensional images and the three-dimensional displacement vector group having been input to the image processing apparatus 500. Then, the three-dimensional image acquisition unit 504 outputs the acquired first three-dimensional image to a cross-sectional image generation unit 510. Further, the three-dimensional image acquisition unit 504 outputs the acquired second three-dimensional image and the three-dimensional displacement vector group to the corresponding cross-sectional image generation unit 511.

Further, the three-dimensional image acquisition unit 504 outputs the three-dimensional displacement vector group to the deformation data generation unit 506. As described above, in the present exemplary embodiment, the three-dimensional image acquisition unit 504 is functionally operable as the above-described correlating unit 107 that can acquire correlation information between different images.

The deformation data generation unit 506 calculates a second lesion position indicating the position corresponding to the first lesion position in the second three-dimensional image, based on the acquired first lesion position data and the three-dimensional displacement vector group. Further, the deformation data generation unit 506 outputs the calculated second lesion position to the corresponding cross-sectional image generation unit 511.

Alternatively, it is useful to store a second lesion position calculated beforehand in the data server 590, instead of causing the deformation data generation unit 506 to calculate the second lesion position. In this case, the position acquisition unit 503 acquires the second lesion position from the data server 590 and outputs the acquired second lesion position to the corresponding cross-sectional image generation unit 511.

Across section setting unit 508 acquires information relating to a movement of a plane in the rotational direction, in the rotational angle, and in each axis direction, which is input to the image processing apparatus 500 by an operator with the mouse 1005.

Further, the cross section setting unit 508 sets a cross section in the first three-dimensional image based on the acquired information. Then, the cross section setting unit 508 outputs the position and orientation of a plane representing the cross section in the first three-dimensional image to the cross-sectional image generation unit 510 and further to the corresponding cross-sectional image generation unit 511.

The cross-sectional image generation unit 510 generates an image of the cross section having been set in the first three-dimensional image. To this end, the cross-sectional image generation unit 510 acquires the first three-dimensional image as an output of the three-dimensional image acquisition unit 504 and the position and orientation of the cross section as an output of the cross section setting unit 508.

Then, the cross-sectional image generation unit 510 generates a cross-sectional image based on the acquired image and information and outputs the generated image to an image synthesis unit 520.

The corresponding cross-sectional image generation unit 511 generates an image of a corresponding cross section in the first three-dimensional image, which corresponds to the cross section having been set in the first three-dimensional image, based on various information having been acquired. Then, the corresponding cross-sectional image generation unit 511 outputs the generated image of the corresponding cross section to the image synthesis unit 520.

The processing to be performed by the corresponding cross-sectional image generation unit 511 is described below in more detail with reference to the flowchart, which illustrates an example procedure of the entire processing that can be performed by the image processing apparatus 500.

The image synthesis unit 520 combines the image of the cross section with the image of the corresponding cross section and displays the combined image. To this end, the image synthesis unit 520 acquires the image of the cross section as an output of the cross-sectional image generation unit 510 and the image of the corresponding cross section as an output of the corresponding cross-sectional image generation unit 511. Then, the image synthesis unit 520 combines the acquired images and displays a combined image.

A basic configuration of a computer that executes a computer program (a software program) to realize the above-described functions of respective components constituting the image processing apparatus 500 is similar to that of the computer illustrated in FIG. 2 according to the first exemplary embodiment.

Figure 6:
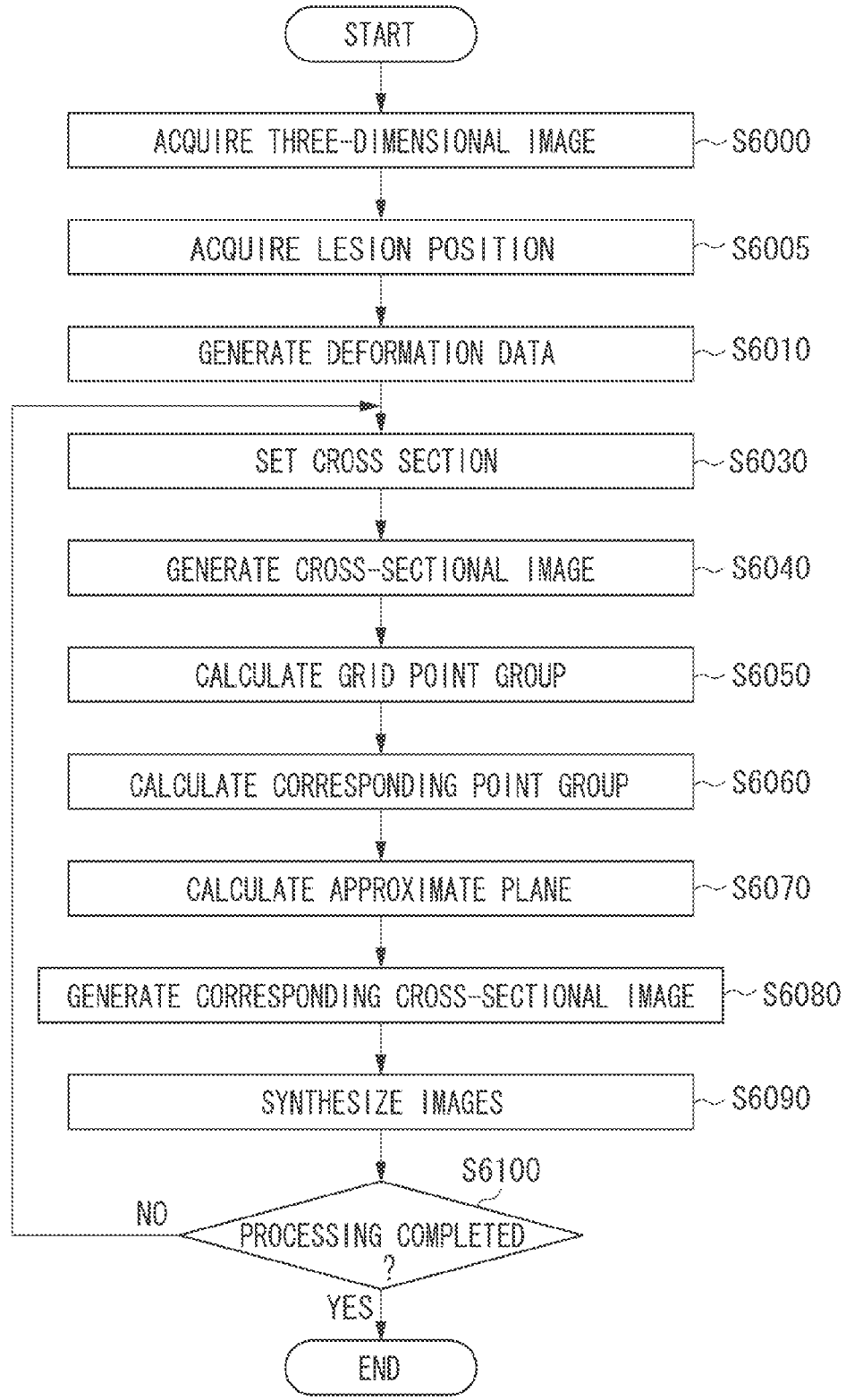
FIG. 6 is a flowchart illustrating an example procedure of the entire processing according to the second exemplary embodiment of the present invention.

FIG. 6 is a flowchart illustrating an example procedure of the entire processing that can be implemented by the image processing apparatus 500. In the present exemplary embodiment, the CPU 1001 executes the program that can realize the functions of respective constituent components so as to reflect the flowchart illustrated in FIG. 6.

In the present exemplary embodiment, it is assumed that the program codes relating to the flowchart illustrated in FIG. 6 are already loaded, for example, from the external storage device 1007 to the RAM 1002, before starting the following processing.

In step S6000, the image processing apparatus 500 executes, as example processing that can be implemented by the three-dimensional image acquisition unit 504, processing for acquiring the first and second three-dimensional images and the three-dimensional displacement vector group that are input to the image processing apparatus 100.

In step S6005, the image processing apparatus 500 executes, as example processing that can be implemented by the position acquisition unit 503, processing for acquiring the first lesion position data (e.g., a centroid position of a lesion illustrated in FIG. 7) that is input from the data server 590 to the image processing apparatus 100.

In step S6010, the image processing apparatus 500 executes, as example processing that can be implemented by the deformation data generation unit 506, processing for calculating the second lesion position (i.e., the position in the second three-dimensional image that corresponds to the first lesion position) based on the acquired three-dimensional displacement vector group.

For example, the image processing apparatus 500 selects a voxel constituting the first three-dimensional image that is positioned most closely to the first lesion position. Then, the image processing apparatus 500 obtains the second lesion position by adding a three-dimensional displacement vector at the selected voxel position to the first lesion position. According to the example illustrated in FIG. 7, the image processing apparatus 500 calculates the centroid position (see 710) of the lesion.

In step S6030, the image processing apparatus 500 executes, as example processing that can be implemented by the cross section setting unit 508, processing for setting the position and orientation of a plane that represents a cross section based on a designation by an operator.

In step S6040, the image processing apparatus 500 executes, as example processing that can be implemented by the cross-sectional image generation unit 510, processing for generating a cross-sectional image that can be obtained by segmenting a predetermined range of the cross section having been set in step S6030 from the first three-dimensional image acquired in step S6000.

Next, the image processing apparatus 500 executes, as example processing that can be implemented by an approximate plane calculation unit (not illustrated) provided in the corresponding cross-sectional image generation unit 511, processing for calculating an approximate plane that is a plane approximating a corresponding cross section in the second three-dimensional image through the following processing of step S6050 to step S6070.

The processing to be performed in step S6050 is similar to the processing performed in step S3050 described in the first exemplary embodiment, although it is not described below in detail.

In step S6060, the image processing apparatus 500 executes, as example processing that can be implemented by the corresponding cross-sectional image generation unit 511, processing for displacing the positions of respective grid points calculated in step S6050 based on the three-dimensional displacement vector group acquired in step S6000.

Then, the image processing apparatus 500 calculates the positions of point group (corresponding point group) in the second three-dimensional image that correspond to the displaced positions of the grid point group in the first three-dimensional image. More specifically, the image processing apparatus 500 selects, for example, a voxel constituting the first three-dimensional image that is positioned most closely to the position $x_{sn}$ (n=1 to N) of each grid point.

Then, the image processing apparatus 500 calculates the position $x_{dn}$ (n=1 to N) of each corresponding point in the second three-dimensional image by adding a three-dimensional displacement vector at the selected voxel position to the positions of respective grid points.

In step S6070, the image processing apparatus 500 executes, as example processing that can be implemented by the corresponding cross-sectional image generation unit 511, processing described below. More specifically, the image processing apparatus 500 calculates an approximate plane of the corresponding point group based on the first lesion position acquired in step S6000, the second lesion position calculated in step S6010, and the positions of the point group (corresponding point group) in the second three-dimensional image calculated in step S6060.

More specifically, the image processing apparatus 500 calculates an approximate plane that fits to the corresponding point group $x_{dn}$ (n=1 to N) using the least squares method on condition that the distance from the first lesion position to the cross section is equal to the distance from the second lesion position to the approximate plane.

Further, if an operator designates a desired approximate plane calculation method using the UI (not illustrated), the corresponding cross-sectional image generation unit 111 calculates an approximate plane according to the designated calculation method. For example, the corresponding cross-sectional image generation unit 111 can employ a calculation method including weighting each corresponding point according to the distance from the second lesion position to each corresponding point and obtaining an approximate plane according to the least squares method reflecting the weighting.

Further, instead of using the information relating to the lesion position, the corresponding cross-sectional image generation unit 111 can employ a calculation method similar to the processing performed in step S3070 described in the first exemplary embodiment, such as a calculation method for obtaining a plane that can minimize a sum of distances from corresponding point group according to the least squares method.

The processing to be performed after the above-described calculation of the plane (i.e., estimation of the in-plane moving component and calculation of a segmenting range of the corresponding cross-sectional image) is similar to the processing performed in step S3070 described in the first exemplary embodiment although its description is not repeated.

In step S6080, the image processing apparatus 500 executes, as example processing that can be implemented by the corresponding cross-sectional image generation unit 511, processing for generating a corresponding cross-sectional image by segmenting the predetermined range of the approximate plane calculated in step S6070 from the first three-dimensional image.

In step S6090, the image processing apparatus 500 executes, as example processing that can be implemented by the image synthesis unit 520, processing for displaying the cross-sectional image generated in step S6040 and the corresponding cross-sectional image generated in step S6080 on the display unit 1006.

Figure 7:
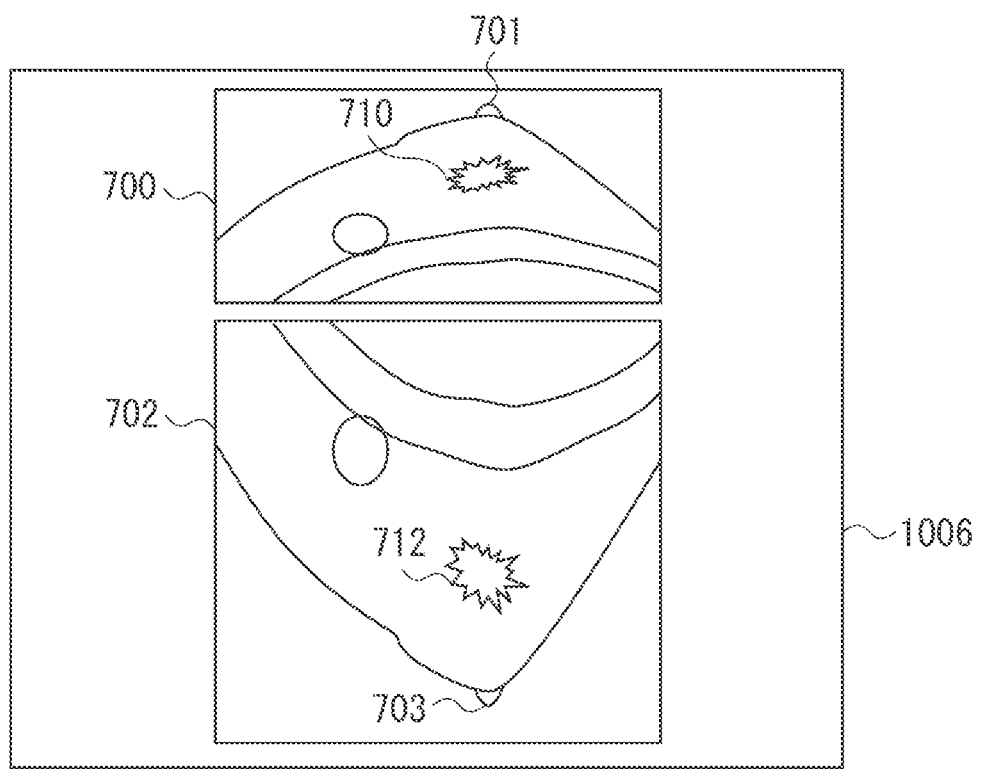
FIG. 7 illustrates an example synthesis display mode according to the second exemplary embodiment of the present invention.

More specifically, as illustrated in FIG. 7, the image processing apparatus 500 can display a prone position cross-sectional image 702 (i.e., a cross-sectional image) in such a manner that a nipple 703 substantially faces on the lower side of a screen. Further, the image processing apparatus 500 can display a supine position cross-sectional image 700 (i.e., a corresponding cross-sectional image) in such a manner that a nipple 701 substantially faces upward on the upper side of the screen.

In this case, the image processing apparatus 500 determines the layout realizing a mirror image relationship between two images 700 and 702, according to which the images 700 and 702 are substantially symmetrical in the vertical direction. To this end, the image processing apparatus 500 reverses the prone position cross-sectional image in the right and left direction.

Further, if an operator designates a desired cross-sectional image display mode using the UI (not illustrated), the image synthesis unit 520 displays a cross-sectional image according to the designated display mode.

For example, the image processing apparatus 500 can employ a method for displaying a nipple facing upward in each of the prone position cross-sectional image and the supine position cross-sectional image without reversing the image in the right and left direction.

Further, the image processing apparatus 500 can employ a method for displaying the supine position cross-sectional image including a nipple facing upward in a reversed state in the right and left direction and displaying the prone position cross-sectional image including a nipple facing downward in a non-reversed state in the right and left direction (more specifically, the image to be reversed in the right and left direction is switched from the prone position to the supine position).

In step S6100, the image processing apparatus 500 determines whether the entire processing has been completed. For example, an operator can click the end button disposed on the display unit 1006 with the mouse 1005 to input a termination instruction to the image processing apparatus 500. If it is determined that the entire processing has been completed (YES in step S6100), the image processing apparatus 500 terminates the processing of the flowchart illustrated in FIG. 6.

On the other hand, if it is determined that the entire processing has not been completed (NO in step S6100), the processing returns to step S6030 to repeat the above-described processing in step S6030 to step S6090.

As described above, the image processing apparatus 500 can execute processing in a manner capable of realizing the present invention.

As described above, the image processing apparatus according to the present exemplary embodiment calculates a plane that approximates a corresponding cross section of a deformed three-dimensional image corresponding to a cross section of a non-deformed three-dimensional image based on the position of a lesion.

Therefore, the image processing apparatus according to the present exemplary embodiment can calculate a corresponding cross section without deforming two three-dimensional images into the same shape, and can display these images Further, the image processing apparatus according to the present exemplary embodiment can realize a correlated display enabling users to easily compare a non-deformed cross-sectional image and a deformed cross-sectional image when a deformation occurs due to a change in the posture of a diagnosis target.

In the above-described exemplary embodiment, the image processing apparatus designates a cross section in a non-deformed three-dimensional image and generates a corresponding cross-sectional image that corresponds to a deformed three-dimensional image.

However, similar to the first exemplary embodiment, the image processing apparatus can designate a cross section in a deformed three-dimensional image and generate a corresponding cross-sectional image that corresponds to a non-deformed three-dimensional image.

A corresponding cross-sectional image generation method to be used in this case is similar to the method described in the first exemplary embodiment, although it is not described below. Further, in a case where designation of a cross section is feasible in either a non-deformed three-dimensional image or a deformed three-dimensional image, if a cross section in one three-dimensional image is designated, the image processing apparatus can generate and display a corresponding cross section of the other three-dimensional image.

In the above-described exemplary embodiment, the data server 590 stores each first lesion position representing the lesion position in the first three-dimensional image. However, instead of causing the data server 590 to store lesion position information, the image processing apparatus 500 can perform setting of the first lesion position as part of the processing to be performed.

For example, when a general UI that enables an operator to point an arbitrary coordinate position in a three-dimensional image is available, the operator can designate a centroid position of a lesion, if found in the first three-dimensional image, and set the designated position as a first lesion position.

For example, when a lesion is included in a cross-sectional image (see a lesion 712 illustrated in FIG. 7), the operator can designate a centroid of the lesion (e.g., a central region of the lesion 712) with the mouse 1005 to set the designated position as a first lesion position.

In this case, in step S6070, the approximate plane calculation unit calculates an approximate plane based on the positions of a corresponding point group (i.e., not relying on the lesion position), similar to the first exemplary embodiment, until the first lesion position is designated by an operator. Further, if the first lesion position is set by the operator, then the approximate plane calculation unit starts calculating an approximate plane based on the position designated by the operator.

The lesion position can be set based on an automatic detection of the lesion in the image processing. In this case, considering the reliability of the automatic lesion detection, it is useful to change a weighting factor to be used in calculating an approximate plane in step S6070. For example, when the reliability can be expressed using a numerical value ranging from 0 to 1, it is useful to multiply the weighting factor by a numerical value representing the reliability.

The present invention is not limited to the above-described exemplary embodiments. For example, the present invention can be embodied as a system, an apparatus, a method, a program, or a storage medium. More specifically, the present invention can be applied to a system including a plurality of devices or can be applied to an apparatus including a single device.

According to the present invention, a software program can be directly or remotely supplied to a system or an apparatus. A computer in the system or the apparatus can execute the program code to realize the functions of the above-described exemplary embodiments.

In this case, the program supplied to the system or the apparatus is the computer program relating to the flowcharts illustrated in the above-described exemplary embodiments.

Accordingly, the present invention encompasses the program code itself installed on the computer to cause the computer to realize the functions and processes according to the present invention. Namely, the present invention encompasses a computer program itself that can realize the functions and processes according to the present invention.

In this case, object codes, interpreter programs, and OS script data are usable if they possess functions equivalent to the above-described computer program.

A computer-readable storage medium supplying the computer program can be selected from any one of a Floppy® disk, a hard disk, an optical disk, a magneto-optical (MO) disk, a compact disc-ROM (CD-ROM), a CD-recordable (CD-R), a CD-rewritable (CD-RW), a magnetic tape, a non-volatile memory card, a ROM, and a digital versatile disc (DVD (DVD-ROM, DVD-R)).

The method for supplying the program includes accessing a website on the Internet using the browsing function of a client computer, when the website allows each user to download the computer program of the present invention, or compressed files of the programs having automatic installing functions, to a hard disk or other recording medium of the user.

Furthermore, the program code constituting the program of the present invention is dividable into a plurality of files so that respective files are downloadable from different websites. Namely, the present invention encompasses World Wide Web (WWW) servers that allow numerous users to download the program files so that their computers can realize the functions or processes according to the present invention.

Moreover, enciphering the program according to the present invention and storing the enciphered program on a CD-ROM or a comparable storage medium is an exemplary method when the program of the present invention is distributed to users. The authorized users (i.e., users satisfying predetermined conditions) are allowed to download key information from a website on the Internet. The users can decipher the program with the obtained key information and can install the program on their computers.

When the computer reads and executes the installed program, the computer can realize the functions of the above-described exemplary embodiments.

Moreover, an operating system (OS) or other application software running on a computer can execute part or all of actual processing based on instructions of the programs to realize the functions of the above-described exemplary embodiments.

Additionally, the program read out of a storage medium can be written into a memory of a function expansion board inserted in a computer or into a memory of a function expansion unit connected to the computer. In this case, based on instructions of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-288457 filed Dec. 18, 2009, which is hereby incorporated by reference herein in its entirety.

What is claimed is:

1. An image processing apparatus comprising:
an acquisition unit configured to acquire a tomographic image of the human body in a first body position and to acquire a first three-dimensional image of the human body in a second body position, the tomographic image being captured by a first image capturing apparatus and the first three-dimensional image being captured by a second image capturing apparatus;
a first generation unit configured to generate deformation data indicating a deformation of the first three-dimensional image from the second body position to the first body position;
a second generation unit configured to generate a first cross-sectional image of the first three-dimensional image, and a second cross-sectional image based on the deformation data, wherein a position and a posture of the first cross-sectional image, the second cross-sectional image and the tomographic image correspond to each other; and
a control unit configured to control a display unit to display the first cross-sectional image, the second cross-sectional image and the tomographic image, so that the first cross-sectional image and the second cross-sectional image are arranged in a mirror image relationship.

2. The image processing apparatus according to claim 1, wherein the second generation unit is configured to obtain a plane that approximates a curved surface corresponding to a cross section in the first three-dimensional image based on the correlation information and is further configured to generate the first cross-sectional image based on the obtained plane.

3. The image processing apparatus according to claim 1, further comprising:
a position acquisition unit configured to acquire a position in the first three-dimensional image or in a second three-dimensional image generated by deforming the first three-dimensional image based on the generated deformation data,
wherein the second generation unit is configured to generate the first cross-sectional image based on the correlation information and the acquired position.

4. The image processing apparatus according to claim 1, wherein the first three-dimensional image is an image obtained by capturing an image of the target object and a second three-dimensional image is an image obtained by deforming the first three-dimensional image, and the image processing apparatus further comprises a cross section setting unit configured to set a cross section of the tomographic image in the second three-dimensional image,
wherein the second generation unit is configured to generate the first cross-sectional image corresponding to the cross section having been set by the cross section setting unit.

5. The image processing apparatus according to claim 1, wherein the first three-dimensional image is an image of a breast captured in a prone position, and the second three-dimensional image is an image of a breast held in a supine position that is obtained by deforming the first three-dimensional image, and the image processing apparatus further comprises a control unit configured to cause a display device to display the second cross-sectional image in such a manner that a nipple substantially faces upward and the first cross-sectional image relating to the first three-dimensional image in such a manner that a nipple substantially faces downward.

6. The image processing apparatus according to claim 1, wherein the first three-dimensional image is an image captured with an MRI apparatus.

7. An image processing method comprising:
acquiring a tomographic image of human body in a first body position and a first three-dimensional image of the human body in a second body position, the tomographic image being captured by a first image capturing apparatus and the first three-dimensional image being captured by a second image capturing apparatus;
generating deformation data indicating a deformation of the first three-dimensional image from the second body position to the first body position;
generating a first cross-sectional image of the first three-dimensional image, and generating a second cross-sectional image based on the deformation data, wherein a position and a posture of the cross-sectional image, the second cross-sectional image and a tomographic image correspond to each other; and
controlling a display unit to display the first cross-sectional image, the second cross-sectional image and the tomographic image, so that the first cross-sectional image and the second cross-sectional image are arranged in a mirror image relationship.

8. A non-transitory computer readable storage medium for storing a computer program that causes a computer to implement an image processing method, the computer program comprising:
computer-executable instructions for acquiring a tomographic image of a human body in a first body position and a first three-dimensional image of the human body in a second body position, the tomographic image being captured by a second image capturing apparatus;

Computer-executable instruction for generating deformation data indicating deformation of the first three-dimensional image from the second body position to the first body position;

Computer-executable instructions for generating a first cross-sectional image of the first three-dimensional image, and a second cross-sectional image based on the deformation data, wherein apposition and a posture of the first cross-sectional image, the second cross-sectional image and the tomographic image corresponding to each other;

And computer-executable instructions for controlling a display unit to display the first cross-sectional image, the second cross-sectional image and tomographic image, so that the first cross-sectional image and the second cross-sectional image are arranged in a mirror image relationship.

9. An image displaying apparatus comprising:

an acquisition unit configured to acquire a tomographic image of a breast of a human body in a supine position and a acquire a first three-dimensional image of the breast of the human body in a prone position, the tomographic image being captured by an ultrasonic image apparatus and the first three-dimensional image being captured by one of a magnetic resonance imaging apparatus, and X-ray computed tomography imaging apparatus, a photo acoustic tomography apparatus, an optical coherence tomography apparatus, a positron emission tomography apparatus and a single photon emission computed tomography apparatus;

a first generation unit configured to generate deformation data indicating a deformation of the first three-dimensional image from the prone position to the supine position;

a second generation unit configured to generate a first cross-sectional image of the first three-dimensional image, and a second cross-sectional image based on the deformation data, wherein a position and a posture of the first cross-sectional image, the second cross-sectional image and the tomographic image correspond to each other; and a display control unit configured to display the first cross-sectional image and the second cross-sectional image that are arranged in a minor image relationship, according to which a nipple of the breast facing upward is positioned on an upper region of a screen and the nipple facing downward is positioned on a lower region of the screen.

* * * * *